United States Patent [19]

Heflin et al.

[11] Patent Number: 5,221,192
[45] Date of Patent: Jun. 22, 1993

[54] ELASTOMERIC COMPRESSOR STUD MOUNT

[75] Inventors: Christopher Heflin; Dale R. Bennett, both of Indianapolis, Ind.

[73] Assignee: Carrier Corporation, Syracuse, N.Y.

[21] Appl. No.: 914,293

[22] Filed: Jul. 16, 1992

[51] Int. Cl.$^5$ .................. F04B 21/00; F01B 31/00
[52] U.S. Cl. .................................. 417/363; 248/638
[58] Field of Search ............ 417/363; 248/638, 632, 248/615, 603

[56] References Cited

U.S. PATENT DOCUMENTS

| | | | |
|---|---|---|---|
| 2,092,919 | 9/1937 | Johnson | 248/632 |
| 2,361,529 | 10/1944 | Briggs | 248/615 |
| 2,573,145 | 10/1951 | Sprouse | 417/363 |
| 2,930,556 | 3/1960 | Horlacher | 248/638 |
| 3,465,954 | 9/1969 | Ellis | 417/363 |
| 3,785,167 | 1/1974 | Sahs. | |
| 4,161,812 | 7/1979 | Litch | 417/363 |
| 4,584,928 | 4/1986 | Haynes | 248/603 |
| 4,888,962 | 12/1989 | Harper et al. | |
| 5,004,207 | 4/1991 | Ishikawa | 248/638 |
| 5,020,767 | 6/1991 | Ueda et al. | 248/638 |
| 5,070,708 | 12/1991 | Malosh et al. | |

Primary Examiner—Richard A. Bertsch
Assistant Examiner—Roland McAndrews

[57] ABSTRACT

An elastomeric mount for a compressor is formed of upper and lower stud portions with a solid elastomeric section therebetween to thereby provide improved vibrational damping performance in both the vertical and transverse directions. The three elements are integrally joined by molding the studs into the elastomeric portion, and the binding between the elements is enhanced by way of an adhesive.

5 Claims, 1 Drawing Sheet

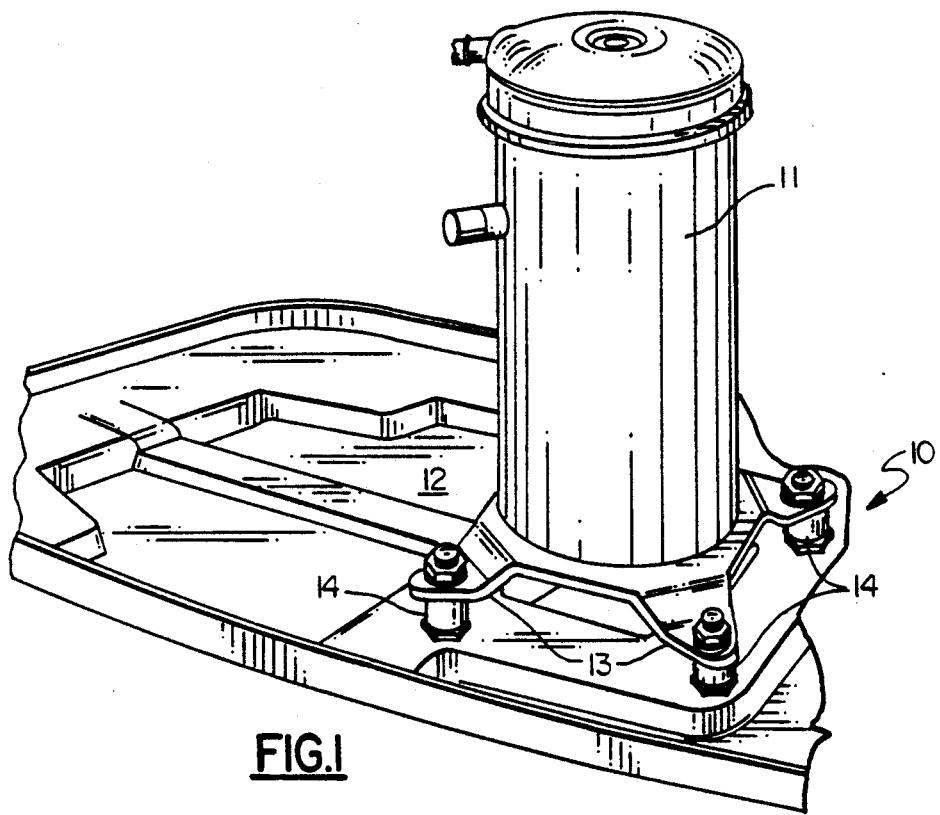
FIG.1
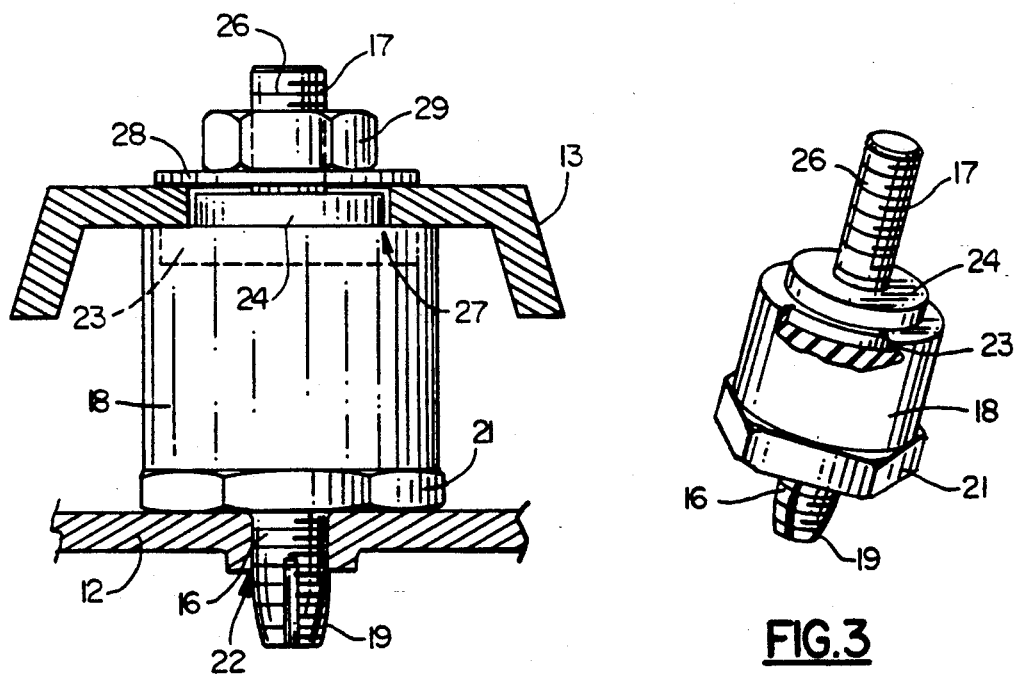
FIG.2
FIG.3

ELASTOMERIC COMPRESSOR STUD MOUNT

BACKGROUND OF THE INVENTION

This invention relates generally to refrigerant compressors and, more particularly, to a fixture for mounting a compressor to the base pan of an air conditioner unit.

It is customary in the design of air conditioning systems to mount the refrigerant compressor to the base pan of the condensing or outdoor unit. In such an installation, it is desirable to dampen the vibrations that are caused by operation of the compressor. This is generally accomplished with elastomeric grommets that are placed between the base of the compressor and the base pan to which it is mounted. The common approach for attaching a compressor to a base pan is by way of studs. The grommets are attached to the compressor feet and the compressor, with grommets, is set on the base pan. The studs (with sleeves) are then pushed through the grommets and threadably driven into an extruded hole in the base pan.

The Applicants have recognized that the upstanding stud can function to transmit the vibrations from the compressor to the base pan. This is true even when care is taken so that the compressor is entirely isolated from any metal to metal connection between the compressor foot and the base pan, such as by providing an elastomeric grommet that passes through the opening in the foot of the compressor and including a collar or head on the upper end thereof such that when the mounting bolts are placed through the center of the grommet, the head of the mounting bolt rests on the elastomeric collar of the grommet. Further, the Applicants have recognized that such a "through-bolt" arrangement permits only minimal lateral movement of the compressor with respect to the base pan, a need which is becoming more prevalent with the coming of the rotary compressors such as the scroll compressor.

It is therefore an object of the present invention to provide an improved device for mounting a compressor to a base pan.

Another object of the present invention is the provision for reduced transmissions of vibration between a compressor and a base pan.

Yet another object of the present invention is the provision in a compressor mount device for allowing increased lateral movement of a compressor with respect to a base pan to which it is attached.

Yet another object of the present invention is the provision for a compressor mount device which is economical to manufacture and assemble and effective in use.

These objects and other features and advantages become more readily apparent upon reference to the following description when taken in conjunction with the appended drawings.

SUMMARY OF THE INVENTION

Briefly, in accordance with one aspect of the invention, a lower stud for attachment to a base pan is interconnected to an upper stud for attachment to a compressor foot, by way of a solid elastomeric element which is integrally formed between the two so as to provide complete elastomeric isolation between the two studs and which also allows lateral relative movement therebetween. The three elements are integrally formed by way of a molding process, with an adhesive also being used between the elastomeric material and the studs.

In accordance with another aspect of the invention, the lower stud has a head formed thereon for engagement with a tool for driving the lower stud into the base pan. The lower stud includes a thread cutting portion at the lower end thereof to facilitate the installation.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a perspective view of a compressor installation in accordance with the present invention.

FIG. 2 is a sectional view of the compressor mount in accordance with the present invention.

DESCRIPTION OF THE PREFERRED EMBODIMENT

Referring now to FIG. 1, the invention is shown at 10 as applied to a compressor 11 which is mounted to the base pan 12 of an air conditioning condensing unit. The compressor 11 includes a plurality of radially extending flanges or feet 13 which are mounted to the base pan 12 by mount devices 14 in accordance with the present invention.

The mount 14 is shown in greater detail in FIG. 2 as installed between the base pan 12 and the compressor foot 13. It comprises a lower stud 16, an upper stud 17, and an elastomeric isolator 18. Both the lower stud 16 and the upper stud 17 are integrally formed with the elastomeric isolator 18, in a manner to be described hereinafter, to provide a unitary mount member which exhibits improved vibrational damping characteristics. The lower stud 16 includes a thread cutting or self tapping portion 19 at lower end, and a rather large hex head 21 at its upper end. The hex head 21 allows for a wrench to be applied directly thereto so as to permit the driving of the lower stud 16 into an opening 22 of the base pan 12. In this way, the torque required to drive the lower stud 16 into place does not have to be transmitted through the elastomeric isolator 18.

The elastomeric isolator 18 is formed of a solid neoprene material which is preferably molded over the lower and upper studs 16 and 17 in a manner to be described hereinafter.

The upper stud 17 includes a rather large disk-like embedded portion 23, a shoulder portion 24, and a threaded portion 26. The embedded portion 23 functions to secure the upper stud 17 to the elastomeric isolator 18. The shoulder portion 24 is sized so as to substantially fill the opening 27 through the compressor foot 13. The position, and the relatively large size of the shoulder portion 24 permits the forces that are created by the lateral movement of the compressor foot 13 to be distributed more evenly across the diameter of the elastomeric isolator 18 than would otherwise occur if these forces were exerted on the threaded portion 26. A washer 28 is placed over the shoulder portion 24, in overlapping relationship with the compressor foot 13, and is secured tightly by a nut 29. In this way, vertical movement of the compressor foot 13 is prevented except as may occur by the tensile or compression movement of the elastomeric isolator 18.

Having described the structure, the method of manufacture will now be described. First, an adhesive is applied to the top surface of the hex head 21 of the lower stud 16 and to the bottom surface of the imbedded portion 23 of the upper stud 17. The adhesive is also allowed to run over the edges to the side surfaces of those elements. The hex head 21 and the embedded portion 23 are then placed into mold cavities and the mold is closed. Hot fluid neoprene is then injected into the cavities. The bonding of the neoprene material to the hex head 21 and to the embedded portion 23 is facilitated by both the applied adhesive and by the inherent bonding that results from the molding process. As will be seen in FIG. 2, the neoprene encircles the sides of the embedded portion 23 to provide a surrounding collar of a substantial thickness. It also tends to run over, and therefore to surround the side edges of the hex head 21, but the surrounding layer is not as thick as that around the embedded portion 23. Still, greater tensile strength is provided by allowing this surrounding material to be applied.

In operation, the elastomeric isolator 18 functions to isolate the vibrations of the compressor foot 13 from the base pan 12. Vertical vibrations of the foot 13 are absorbed by the elastomeric isolator being placed in varying degrees of compression. The transverse vibrations are absorbed by the elastomeric isolator 18 being placed in varying degrees of sheer stress. The application of a solid elastomeric element rather than one having a stud passing therethrough, allows for substantially greater flexibility and improved vibration damping performance.

While the present invention has been disclosed with particular reference to a preferred embodiment, the concepts of this invention are readily adaptable to other embodiments, and those skilled in the art may vary the structure thereof without departing from the essential spirit of the invention.

What is claimed is:

1. A mounting device for mounting a compressor foot to an air conditioner base pan, comprising:
    a lower stud section for threadable engagement into a hole in the base pan, said lower stud section having a head formed on its upper end for engagement by a tool for driving said lower stud into the base pan;
    an upper stud section extending upwardly for receiving a compressor foot thereover and having a thread for threadably receiving a nut thereon; and
    an elastomeric middle section secured to said lower stud section at its upper end and secured to said upper stud section at its lower end, said middle section functioning to isolate the vibrations from the compressor foot from the compressor base pan.

2. A mounting device as set forth in claim 1 wherein said lower stud section has a portion thereof with threads which are of the self tapping type, so as to permit the cutting of threads into said base pan hole.

3. A mounting device as set forth in claim 1 wherein said upper stud section has a shoulder formed thereon for being received within an opening in the compressor foot.

4. A mounting device as set forth in claim 1 wherein said elastomeric middle section is molded around said upper stud section.

5. A mounting device as set forth in claim 4 wherein an adhesive is disposed between said elastomeric middle section and each of said upper and lower stud sections.

* * * * *